(12) United States Patent
Madduri et al.

(10) Patent No.: US 7,155,429 B2
(45) Date of Patent: Dec. 26, 2006

(54) METHOD, APPARATUS AND ARTICLE OF MANUFACTURE TO AGGREGATE AUTOMATED TRANSACTION PROCESSION

(75) Inventors: Seshachala Kumar Madduri, Tulsa, OK (US); Koteswar Krishna, Tulsa, OK (US)

(73) Assignee: Bridgelogix Corporation, Tulsa, OK (US)

( * ) Notice: Subject to any disclaimer, the term of this patent is extended or adjusted under 35 U.S.C. 154(b) by 495 days.

(21) Appl. No.: 10/191,468

(22) Filed: Jul. 9, 2002

(65) Prior Publication Data

US 2004/0010500 A1 Jan. 15, 2004

(51) Int. Cl.
G06F 17/30 (2006.01)

(52) U.S. Cl. .................. 707/4; 707/1; 707/2; 707/3; 707/100; 707/10

(58) Field of Classification Search ............ 707/1–4, 707/100
See application file for complete search history.

(56) References Cited

U.S. PATENT DOCUMENTS

| | | | |
|---|---|---|---|
| 5,897,634 A | 4/1999 | Attaluri et al. | |
| 6,119,149 A | 9/2000 | Notani | |
| 6,147,773 A | 11/2000 | Taylor et al. | |
| 6,199,099 B1 | 3/2001 | Gershman et al. | |
| 6,240,413 B1 | 5/2001 | Learmount | |
| 6,256,676 B1 | 7/2001 | Taylor et al. | |
| 6,275,785 B1 | 8/2001 | Currie et al. | |
| 6,301,601 B1 | 10/2001 | Helland et al. | |
| 6,308,178 B1 | 10/2001 | Chang et al. | |
| 6,334,101 B1 | 12/2001 | Hetherington et al. | |
| 2002/0002579 A1 | 1/2002 | Holden et al. | |
| 2002/0129003 A1* | 9/2002 | Bakalash et al. | 707/1 |
| 2002/0198992 A1* | 12/2002 | Stutz et al. | 709/225 |
| 2003/0023620 A1* | 1/2003 | Trotta | 707/203 |

* cited by examiner

Primary Examiner—Jeffrey Gaffin
Assistant Examiner—CamLinh Nguyen
(74) Attorney, Agent, or Firm—Winstead Sechrest & Minick; Henry L. Ehrlich

(57) ABSTRACT

A method, apparatus and article of manufacture to aggregate automated transaction processing and facilitate database integrity. In one embodiment of the invention, identified transactions are interrogated and their associated processing requirements determined. Once determined, transaction processing logic relating to database connection, startup steps, end of step, commit or roll back are removed with the resulting transaction stored as a callable DLL. The resultant DLL or DLLs further modified to re-sequence validation logic to on input data appropriately ordered sequence. The invention additionally comprises first logic which connects to a database in advance of referencing any callable DLL functions; second logic commits to updating a database following successful execution of any called DLL functions and third logic which rollbacks updates to a database following unsuccessful execution of called DLL functions as well as startup step and end of step processing logic. Consequently, multiple transaction processing steps are combined into a single transaction (DLL) which enhances operational efficiency allows end to end acknowledgment and is decreases execution time for multi-step processing.

5 Claims, 1 Drawing Sheet

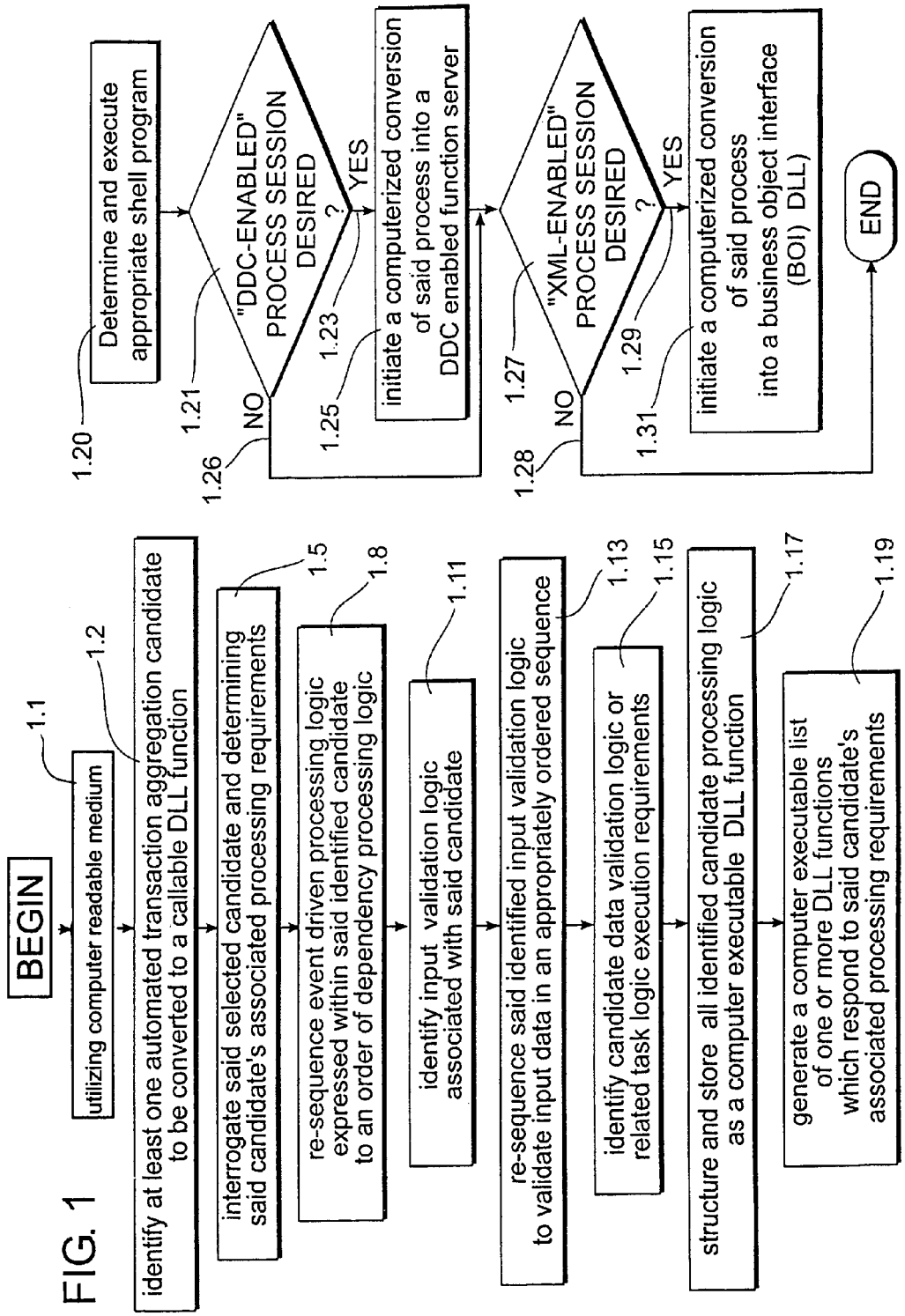

METHOD, APPARATUS AND ARTICLE OF MANUFACTURE TO AGGREGATE AUTOMATED TRANSACTION PROCESSION

REFERENCE TO PENDING APPLICATIONS

This application is not related to any pending applications.

REFERENCE TO MICROFICHE APPENDIX

This application is not referenced in any microfiche appendix.

TECHNICAL FIELD OF THE INVENTION

The present invention relates to transaction processing models and, more particularly, relates to an improved method, apparatus and article of manufacture to aggregate related transaction processing and commitment requirements.

BACKGROUND OF THE INVENTION

In automated transaction processing environments, most relevantly, automated transaction processing environments associated with the manufacturing industry, whenever multiple actions are required to satisfy a user request or event driven interrupt, such multiple sessions (herein synonymously referred to as "transactions") are typically identified and executed sequentially. Sequential processing creates data integrity problems, however, in that each session/transaction is regarded to unit a distinguishable unit of processing and should a second or subsequent transaction fail, the first transaction has likely committed to a prior updating of a database. Consequently, with such sequential processing, the user is often faced with a corrupt database requiring restorative procedures prior to re-initiating the transaction.

The instant invention is known by its apparatus, method and article of manufacture for the teaching away from the contemporary arts executing multiple transactions. In so doing, the instant invention creates a DLL (Dynamic Link Library) for each transaction removing database commit points such that the resulting DCC (Distributed Data Collection) session is regarded as the single unit of processing. By removing commit points from each of the transactions, the associated overhead of multiple database connection and commits are reduced as well as the system overhead of multiple task scheduling. Consequently, the instant invention also ensures that task is treated as a single database transaction which either executes successfully and then commits any associated database updates, or upon determination of unsuccessful education, rolls back previously intended updates and thus restores the database to its (the DLL's) pre-execution status to previous status (integrity).

BRIEF SUMMARY OF THE INVENTION

The following is a brief overview of the steps necessary to effectuate practice of the instant invention. As used herein, the term "BAAN" refers to an illustrative manufacturing transaction base system. The instant invention is not so limited as to interface with the BAAN manufacturing system exclusively but is merely provided for purposes of illustration and disclosure. Consequently, whenever the term BAAN is herein encountered, it should be interpreted as representing any transaction based system wherein transactions/sessions/units are executed and each transaction/session/unit independently responsible for database transaction processing requirements such as but not limited to database commits, rollback, updates, startup step, end of step.

The Instant Invention Process
This following outline of the instant invention process used to create the user sessions and bar-coded version of these sessions. It is important to note that once the DLL(s) discussed herein have been created, such DLL's are available for use in the instant invention (user interactive), DDC (bar-code or other device), or XML (device or Internet) environments. Consequently, to support various processing environments, the only modifications are to the calling "shell program would be required interactive, DDC or XML.

1. Convert appropriate Session(s) into DLL(s).
   (a) The process to be converted is identified in terms of sessions and sub-sessions to be converted. The main session to be converted is chosen and all needed sessions/sub-sessions identified
   (b) The code must be sequenced properly since the DLL must be non-event driven.
   With code therefore be written in an order of process dependency.
   (c) The validation logic must be properly sequenced to validate input data in the proper order and to validate or skip optional parameters as is appropriate.
   (d) Code from other sessions which validate data or perform tasks may need to be incorporated into the DLL. Note that conversion is not one-for-one between sessions and DLLs.
   (e) All transaction processing logic (database connections, start of step, end of step, commit, or rollback) should not be coded into the DLL.
   (f) Multiple DLLs may be created depending upon the complexity and functionality of the session(s) involved.
2. A new session is created to act as the shell driver or main program (all terms used synonymously herein)
   (a) This session will handle the communication, and elementary level validation. Complex edits are not possible without duplicating the code of the DLL. Elementary edits (such as is a required filed blank may be included for user convenience).
   (b) When multiple DLLs are called, they must be sequenced in the proper processing order. Effectively, the elementary edits are event driven, but the main processing consists only of a single process or continue event. Thus the normal method is to tie the main processes to a button click, which activates the process and acts as a single unit.
   (c) Transaction/Database handling logic is incorporated exclusively at this level (e.g. Start of step, end of step, commit, rollback). This logic should not be inserted between DLL sequences, or single main process becomes fragmented.
   (d) It is often desirable to include configuration parameters which allow for some level of process decision-making. When several steps are combined into a single transaction, a configuration parameter may indicate which steps are to be done (possibly in which sequence). This allows a single converted Instant invention session to be used in multiple different implementations.
3. Convert the instant invention session to a function server.
   (a) Using a Baan conversion program, the new user interactive session is converted to a function server.

This allows it to be used for DDC interface applications, typically bar-code device input.
4. The user communication method is modified for both input and output to account for use as a function server versus an interactive session.
5. The sequence of parameters must be checked against the bar-code input generation source to insure that the data is sent and received in the same sequence. If a parameter is to be eliminated, it must be accounted for.
6. Convert the function server for use with XML.
    (a) If the transaction is to be used in the Baan XML environment, the user communication method is modified for that environment. Baan provides standard DLLs to use with the XML environment which send and receive data in the form of XML.

The primary objective of the instant invention is to create a single transaction that processes a single input message and returns a successful/unsuccessful message. Therefore, the process is not event driven. Code will thus be executed sequentially, and that sequence must be pre-determined. Consequently, the first task is to understand those system processes involved in the physical task being converted. In manufacturing systems there are often multiple software tasks which represent a single physical task perform by a human. As an example, the receipt of purchased goods from a vendor and the stocking of these goods often have several variations, depending upon the business rules in place at the facility in question. In a complex manufacturing software system (such as Baan), many transactions are typically executed to accomplish a task such as purchase goods receipt. This is due to the design considerations of the software developer at the time the software was designed; in order to achieve maximum flexibility in the software design, the software is "modularized" into several transactions which will the be needed to accomplish the desired result. The appropriate transactions must be executed in the specific order to fulfill the task. While this approach adds flexibility to the software system, in that transactions can be more generic in nature, it also leads to increased overhead on the part of the user, in that several transactions are needed. Using a receipt of goods example, the system must verify part number being received, the order number being received, and the quantity of goods to receive as basic edits. The system is be capable of distinguishing between parts which must be lot tracked, parts which must be serial number tracked, and parts with neither lot nor serial number tracking. These variations in process result most often in the insertion of an additional transaction. In this example, a lot record must be created for lot tracking purposes before the process can continue. In event-oriented software systems these decision points are sometimes used to invoke sub-transactions or serve as terminating points between transactions.

The first step in the process of the instant invention is to identify each of the components (transactions and sub-transactions) to be used in the process, and the sequence in which they are performed. These transactions and sub-transactions then must be converted to DLLs. Often this involves include pieces of related transactions either by converting the pieces to separate a DLL or including the code in the main transaction. In cases where re-use of the routines involved by other Instant invention transactions is desirable, a separate DLL is created and called. In cases the code is used for a single transaction, in may be included into the main DLL. During the conversion process, all database imparts and commits must be remove from the converted code, as the instant invention seeks to avoid changes committed to the database independently of the main transaction which will call these DLLs.

Once the proper transactions or partial transactions have been converted to DLLs, the next task is to created a single session which will call these DLLs in the proper sequence. This "envelope" a "shell" program is responsible for performing basic tasks: 1) Database connection and committal; 2) Basic communication/data handling functions; 3) Calling of DLL(s) in proper sequence as needed; and. 4) If desirable, interpretation of configuration parameters and event control based upon the value of these parameters. In the case of Baan, standard tools are used to create a new screen and a new session. The screen must contain all the data inputs needed to accomplish the task being converted. The program will have two major parts to it; the first part of the program will interact with the screen supplying defaults and performing elementary edits. The second part of the program will call the DLLs and perform the database updating. The second part of the program will be triggered by a single event, (normally a continue or submit button). The flow of the event processing logic must be to begin the transaction, call the converted DLL(s) in the predetermined sequence, and then check each DLL for error conditions. If errors are encountered in any of the DLL(s) then the transaction must rollback the database and send an appropriate error message; otherwise, the database updates are committed and a successful completion message is sent. In some instances, configuration parameters may be used to determine whether to call a given DLL or to choose between two different DLLs.

At this point, the Instant invention session will handle messages coming through a standard client/server interface (i.e. a PC input message). The next step in the process is to convert the newly created Client/server session to a Baan function server session. This allows input the Baan DDC interface to be passed to a program and a message to be returned to the originating device. The process is to used a readily available utility to convert the new session to a DDC-enabled one. The Output code of the utility essentially maps the input data stream (the data parameters which the DDC module will pass to the program) into variables for use by the program. The value of these variables can then be used by the program. If a passed parameter is not desired, the program must be modified to eliminate the variable, since the variables are positional (i.e. the first field is the first variable, the second field is the second variable, etc.). The DDC module uses pre-defined message return functions to return messages to the user which are different than those used by the Client/server module, so message returns must be constructed to use the DDC functions. The DLL functions are now attached to this session using the standard Baan screen. Once the program has been converted, it is loaded into memory with the standard Baan screen to load a function server.

For sites using the newest Baan interface, XML, another conversion is required. XML transactions run as a DLL receive and sending data in the form of an XML file (object). The conversion is started by taking the Instant invention session and converting it using a converter to convert the script to a BOI (Business Object Interface) DLL. (Baan supplies a standard tool to do this conversion, but Instant invention transactions tend to be too complex. Bridgelogix has written an internal tool to perform this function. The resultant program will remove the code for screen handling and insert a method to call for receiving and parsing an XML file. This parser will load the program variables from the received XML and the program logic will then proceed as normal. Once the program logic is completed, a second call to a standard Baan object will parse the output into an XML file and return it to the calling application.

In view of the aforenoted discussion and deficiencies in the prior art, it is an object of the instant invention to reduce the overhead of multiple database connection and commits.

It is a further object of the instant invention to reduce system overhead associated with multiple task scheduling.

It is yet another object of the instant invention to aggregate transactions into a single database transaction.

It is a further object of the instant invention to roll back any updates to a database upon encountering unsuccessful execution of an associated DLL function.

It is yet another object of the instant invention to aggregate transaction processing in a DCC session.

It is yet another object of the instant invention to aggregate transactions in a manner to ensure continuing database integrity.

It is a further object of the instant invention to aggregate transaction in a XML enabled session.

Other objects and further scope of the applicability of the present invention will become apparent from the detailed description to follow, taken in conjunction with the accompanying drawings wherein like parts are designated by like reference numerals.

DESCRIPTION OF THE DRAWINGS

FIG. 1 is a logic flow diagram of a non-limiting sequence of process steps to effectuate practice of the instant invention.

DETAILED DESCRIPTION OF THE PREFERRED EMBODIMENT

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the present invention.

The specification describe the invention presented and the terms that are employed draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

It is clear, given benefit of the instant invention detail disclosure, that one reasonably skilled in the art could develop similarly intended coding specifications which would replicate the functionality of the processes provided herein. Consequently, it is intended the instant invention encompasses any such functionally equivalent processes and does not limit itself to this specific coding specifications submitted hereunder.

FIG. 1 is a logic flow diagram of an unlimiting sequence process steps to effectuate practice of the instant invention.

The first step of the process of the instant invention is, utilizing computer readable medium 1.1, identify at least one automated transaction aggregation candidate to be converted to a callable DLL function 1.2. Most typically, however, more than one transaction will need to be aggregated to satisfy processing requirements. Consequently, it is likely one or more transactions and sub-transactions will be identified 1.5. These transactions must be ordered in the sequence in which they are to be formed 1.8.

In so doing, such re-sequencing requires an interdependencies between transactions and sub-transactions to be identified and such dependencies represented as processed logic reflected in a order of dependency form.

The next step in practicing the instant invention's transactions and aggregation process, is to identify any input validation logic associated with the candidates 1.11 and to re-sequence said identified input validation logic to validate input data in appropriately or sequence 1.13. Such appropriately ordered sequence may not necessarily be represented in a order of dependency fashion For purposes of full and complete disclosure the instant invention is further illustrated and described on the compact disc deposits attended hereto and incorporated by reference herein. CD materials labels fully disclosed. The pseudo code wherein the detailed functionality of the instant invention with respect to its processing step according to each computing hardware configuration is therein provided as well as logic flow diagrams associated therewith.

The invention requires that all identified candidate processing logic requirements be structured and stored as a computer executable DLL function 1.17. Such functions particularly being grouped and generated as a computer executable list of one or more DLL functions which respond to the candidate's associated processing requirements 1.19.

The invention requires next that one or more applicable shell (hereinafter referred synonymously with "envelope" or "driver programs" be developed which will call one or more of the stored DLL functions as required. However, as the shell program is to serve and be regarded as the individually unit of processing, it bears exclusive responsibility for one database connection and committal, basic communication data handling functions, calling of the DLLs in proper sequence as required and, if desirable, interpretation of configuration parameters and event control based on the value of these parameters Collectively, the aforenoted shell program processing may be regarded as a processing unit database processing. The intent here and process calls for inserting first logic, which connects to a database in advance occurrence of any callable DLL function; second logic, which commits to updating a database following successful execution of any call DLL function; third logic, which rolls back updates to a database following unsuccessful execution of any call DLL functions; and start and end of step processing logic 1.20.

The development of the shell program discussed in association with step 1.20, refers to the interactive user session wherein a terminal user typically interacts with the shell program.

In the event a DDC enabled shell program is required to support I/O devices such as, but not limited to, barcode reading devices 1.23, a computerized conversion of program takes place whereby said program 1.20 is converted into a DDC enabled function server shell 1.25. Should a DDC enabled function server 1.25 not be desired, it is possible an XML enabled process session (shell) should be generated. If such is desired 1.29, a computerized conversion of said process 1.27 is initiated and the process of 1.27 is converted into a business object interface DLL 1.31

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. An apparatus for aggregating automated transaction processing and thereby facilitating continuing database integrity comprising:
   a general purpose computer;
   a memory that stores a transaction aggregation program; and
   a central processing unit that, when executing the program, adapts the general purpose computer to aggregate automated transaction processing and thereby facilitate continuing database integrity;
   wherein the executing program's adaptation of the general purpose computer further comprises:
      executing one or more DLL functions that is/are devoid of database connect, start of step, end of step, commit or rollback transaction processing logic;
      executing an instruction set for connecting to a database prior to executing the one or more DLL functions; and,
      executing an instruction set which commits to updating to a database following successful execution of the DLL functions or rolls backs any updates made to a database following unsuccessful execution of the DLL functions.

2. The apparatus of claim 1 wherein the general purpose computer adaptation further comprises executing an instruction set which adapts the computer to operate as a DDC enabled function server.

3. The apparatus of claim 1 wherein the executing program's adaptation of the general purpose computer adaptation further comprises executing an instruction set which adapts the computer to receive, parse, process and communicate XML files.

4. A process to aggregate automated transaction processing utilizing software to facilitate continuing database integrity, the process comprising the steps of:
   selecting at least one automated candidate to be converted to a callable DLL function;
   interrogating the selected candidate and determining associated processing requirements of the selected candidate;
   re-sequencing event driven processing logic expressed within the selected candidate to an order of dependency processing logic;
   identifying input validation logic associated with the selected candidate;
   re-sequencing the identified input validation logic to validate input data in an ordered sequence;
   identifying data validation logic associated with the selected candidate;
   structuring the identified processing logic;
   storing the identified processing logic; and
   generating a computer executable list of the one or more DLL functions that responds/respond to the associated processing requirements, wherein the DLL function is devoid of database connect, start of step, end of step, commit or rollback transaction processing logic.

5. The process of claim 4, further including the steps of:
   inserting first logic connecting to a database in advance of occurrence of the callable DLL function;
   inserting second logic that commits to updating to updating the database following successful execution of the DLL function; and
   inserting third logic that rolls back updates to a database following unsuccessful execution of the DLL function.

* * * * *